United States Patent [19]

Rosback

[11] Patent Number: 4,568,954

[45] Date of Patent: Feb. 4, 1986

[54] INK CARTRIDGE MANUFACTURING METHOD AND APPARATUS

[75] Inventor: Martin D. Rosback, West Linn, Oreg.

[73] Assignee: Tektronix, Inc., Beaverton, Oreg.

[21] Appl. No.: 678,907

[22] Filed: Dec. 6, 1984

[51] Int. Cl.[4] .................... G01D 15/18; B65D 37/00; B65B 51/10

[52] U.S. Cl. .................................. 346/140 R; 346/75; 222/212; 53/477

[58] Field of Search ...................... 346/75, 140 R, 1.1; 222/212; 53/477

[56] References Cited

U.S. PATENT DOCUMENTS

| | | | |
|---|---|---|---|
| 4,386,929 | 6/1983 | Peery et al. | 604/132 X |
| 4,387,833 | 6/1983 | Venus, Jr. | 222/95 X |

*Primary Examiner*—E. A. Goldberg

*Assistant Examiner*—Gerald E. Preston

*Attorney, Agent, or Firm*—John D. Winkelman; David P. Petersen; Francis I. Gray

[57] ABSTRACT

An ink cartridge 10 is described with a rigid, hollow housing 12 within which an ink container assembly is positioned. The assembly includes an ink container 16 mounted, as by heat sealing, directly to an ink container support 18. The support 18 is secured by fasteners 24 to a cap 14 of the housing with a gasket 22 and gasket retainer 20 positioned between the support 18 and cap 14. The gasket retainer 20 includes plural gasket retaining projections 104, 150, 152, 156 and an outer peripheral wall 23 which bears against the cap 14 when the ink cartridge is assembled. The gasket support 20 and ink container support 18 cooperatively interfit. To manufacture the ink container assembly, the ink container support 18 is inserted through an opening 74 in a sheet of ink container forming material. The portions 78 of the ink container material bounding the opening are then secured to a planar mounting surface 72 of the ink container support 18. Sides 80, 82 of the sheet are then folded together and sealed to complete the ink container 16.

15 Claims, 8 Drawing Figures

INK CARTRIDGE MANUFACTURING METHOD AND APPARATUS

TECHNICAL FIELD

This invention relates to an ink cartridge and ink cartridge manufacturing method. More specifically, the ink cartridge is for an ink jet printer of the type which supplies pressurized fluid to the cartridge for pressurizing ink within the cartridge to enhance the flow of ink from the cartridge to an ink jet printing head.

BACKGROUND OF THE INVENTION

Ink jet printers having one or more ink jet heads for projecting drops of ink onto paper or other printing medium to generate graphic images and text have become increasingly popular. To form color images, multiple ink jet printing heads are used, with each head being supplied with ink of a different color from an associated ink cartridge.

In a common arrangement, the print medium is attached to a rotating drum, with the ink jet heads being mounted on a travelling carriage that traverses the drum axially. As the heads scan spiral paths over the medium, ink from the ink cartridges is delivered to the ink jet heads. Ink drops developed within the heads are projected from a minute orifice to form an image on the medium. A suitable control system synchronizes the generation of ink drops with the rotating drum.

Such printers commonly employ replaceable ink cartridges. One such known cartridge, designated the Maco cartridge, is produced by Matsushita Electronic Components Co., Ltd. of Japan. The Maco cartridge has an internal ink container which includes a collapsible ink bag and an ink bag support. The ink bag is an extruded tube of flexible polyvinylchloride which is thermally sealed at one end. The ink bag support is inserted in the open end of the bag and clamped in place by a mechanical seal. More specifically, the portions of the ink bag which bound the ink bag opening are wedged between the sides of the ink bag support and a surrounding rubber ink bag sealing gasket. The assembled ink bag, ink bag support and ink bag gasket are inserted into an elongated metal clip of U-shaped cross section with a planar base and sides which overlie the sides of the ink bag sealing gasket. This assembly is positioned within a plastic housing. A cap portion of the housing compresses the clip and ink bag sealing gasket to complete the mechanical seal. Also, a cap gasket is provided between the base of the clip and the cap for seaing purposes. Furthermore, fasteners extend through the cap, the cap gasket, openings in the clip, and into corresponding bosses projecting toward the cap from the ink bag support to hold the assembled cartridge together.

The Maco cartridge ink bag support includes an annular projection which defines an ink flow passageway which communicates with the interior of the ink bag. This projection passes through the clip base, abuts one side of the cap sealing gasket, and is aligned with an ink flow port through the cap. When the cap gasket is punctured, ink may flow from the ink bag, through the ink flow passageway, the cap gasket and ink flow port and thereby from the cartridge to an ink jet head. In addition, an annular air flow passageway defining projection ink extends from the ink bag support, through an opening in the clip base, and against the cap gasket. This air flow passageway is aligned with an air flow port through the cap. The air flow passageway has openings which communicate with the interior of the housing outside of the ink bag. When the cap gasket is punctured, air or other fluid under pressure may be delivered through the air flow passageway and into the housing, wherein it applies pressure to the ink bag. This urges ink from the ink bag through the ink flow passageway.

This Maco cartridge construction suffers from a number of disadvantages. For example, cartridges are used in environments where they are subject to being dropped or otherwise impacted. Prior cartridges, such as the Maco cartridge, tend to develop ink leaks when jarred in this manner. Leakage also is a problem when such known cartridges are subjected to substantial environmental temperature fluctuations. Also, leakage of the air pressure surrounding the ink bag is a problem when the cartridge housing is exposed to its own ink, both from the interior and exterior, especially at its solvent bondlines. The result is polycarbonate case cracking and attendant leakage.

In addition, prior cartridges, such as the Maco cartridge, are costly and difficult to manufacture and assemble. In particular, it is difficult to remove air and other gases from the Maco ink bag, by applying a vaccum to the ink flow passageway, before filling the ink bag with ink. It is important to remove such gases from the ink bag to prevent clogging of the ink jet print heads by the gas bubbles from the ink container.

Therefore, a need exists for an ink cartridge apparatus which overcomes these and other disadvantages of the prior art.

SUMMARY OF THE INVENTION

An ink cartridge in accordance with the present invention includes an ink container assembly which includes a flexible ink container mounted directly to an ink container support, as by thermally fusing the ink container to the support. An ink flow opening through the ink container support communicates with the interior of the ink container. A hollow durable housing receives and encloses the ink container assembly. Ink from the ink container passes through the ink container support and an ink flow port of the housing to the exterior of the housing for delivery to an ink jet head. The housing also includes a fluid flow port which communicates with the interior of the housing, but exteriorly of the ink container. When pressurized fluid, such as air, is fed through the fluid flow port to the interior of the housing, pressure is applied to the exterior of the ink container. This enhances the flow of ink from the ink container and cartridge.

As a more specific feature of the invention, the ink container support includes a planar ink container mounting surface along its perimeter. The ink container includes portions which define an opening for receiving the ink container support, such latter portions of the ink container abut the ink container mounting surface and are thermally fused thereto so as to seal the ink container support to the ink container.

As still another feature of the invention, the ink container assembly is formed by providing a sheet of ink container material with a central opening, positioning the ink container support within the opening, securing the ink container support to the ink container to seal the central opening, folding the sheet to form sides of the ink container, and securing the sides of the ink container together. In the illustrated preferred embodiment, the securing steps are accomplished by thermally fusing the elements together.

As a further feature of the invention, the ink container is formed of a multi-layered material with a first interior layer of a material which resists corrosion by ink in contact with such layer, a second layer of a vapor barrier material, and a third layer of an ink container reinforcing material.

As still another feature of the invention, the housing includes an elongated body portion and a cap. In addition, a gasket is positioned along the interior surface of the cap and a gasket support is provided between the gasket and the ink container support. The gasket support includes a peripheral wall which extends in a first direction and against the interior surface of the cap. In addition, gasket retaining projections also extend in the first direction and against the gasket to hold the gasket in place. Moreover, fasteners secure the cap, gasket, gasket support and ink container support together.

As a more specific feature of the invention, the gasket support includes a fluid passageway defining projection leading to the portion of the interior of the housing which is outside of the ink container. Upon delivery of pressurized fluid through this fluid passageway, pressure is applied to the ink container and enhances the flow of ink therefrom. Also, the gasket support has an opening through which an ink passageway defining projection of the ink container support extends into engagement with the gasket.

As still another specific feature of the invention, the gasket support and ink container support cooperatively interfit to strengthen and facilitate the assembly of the ink cartridge construction.

It is accordingly one object of the present invention to provide an improved ink cartridge and method of manufacturing such a cartridge, the cartridge being for an ink jet printer of the type which supplies air or other pressurized fluid to the cartridge to enhance the flow of ink from the cartridge to an ink jet head of the ink jet printer.

It is another object of the invention to provide such an ink cartridge which resists the development of ink leaks due to shock and other impacts on the cartridge, due to environmental temperature fluctuations to which the cartridge is subjected, due to excessive fluid pressures within the cartridge, and due to exposure of internal and external portions of the cartridge housing to ink.

It is still another object of the invention to provide such an ink cartridge which is economical to manufacture and which utilizes a relatively small number of parts.

A further object of the invention is to provide such an ink cartridge which is easy to install in an ink jet printer, is easy to handle, and is easy to remove without spilling ink.

These and other objects, features and advantages of the present invention will become apparent with reference to the following description and drawings.

DETAILED DESCRIPTION OF PREFERRED EMBODIMENT

Figure 1:
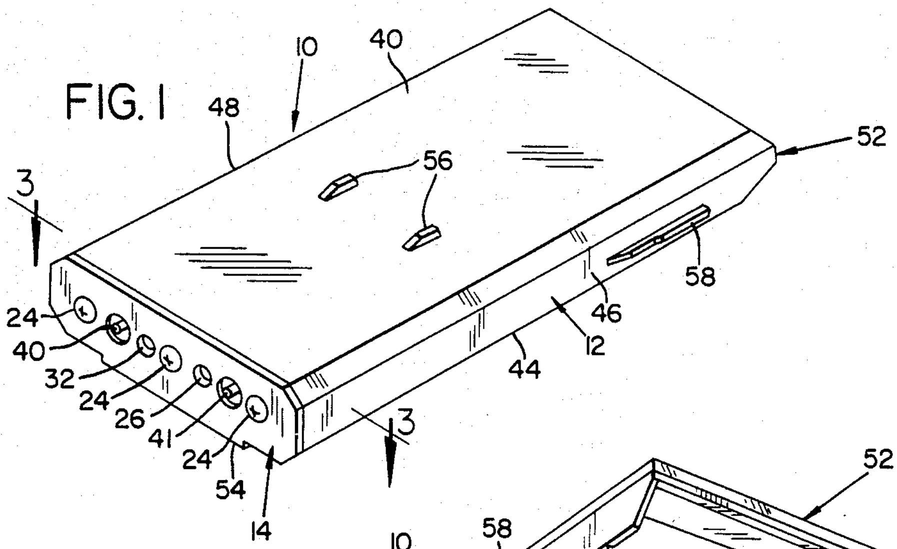
FIG. 1 is an isometric view of an ink cartridge in accordance with the present invention.
Figure 2:
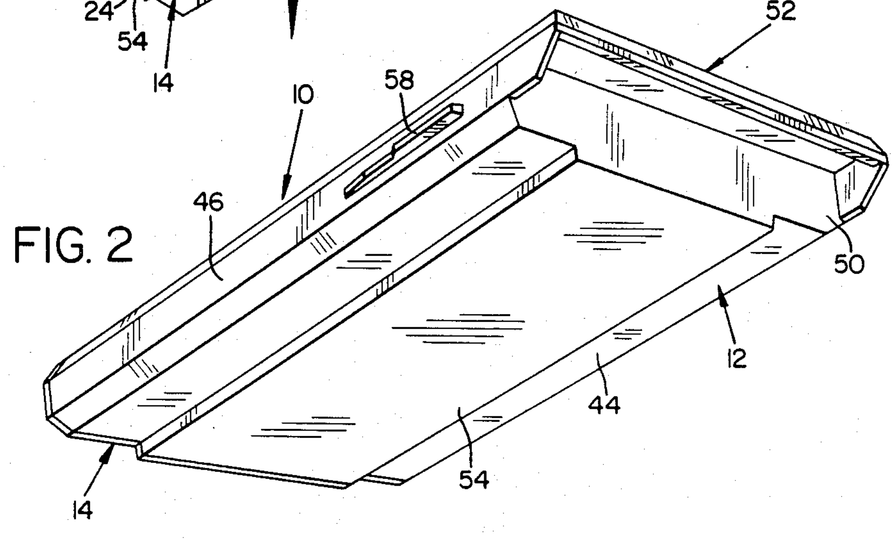
FIG. 2 is an isometric view of the underside of the ink cartridge of FIG. 1.
Figures 6, 7, 8:
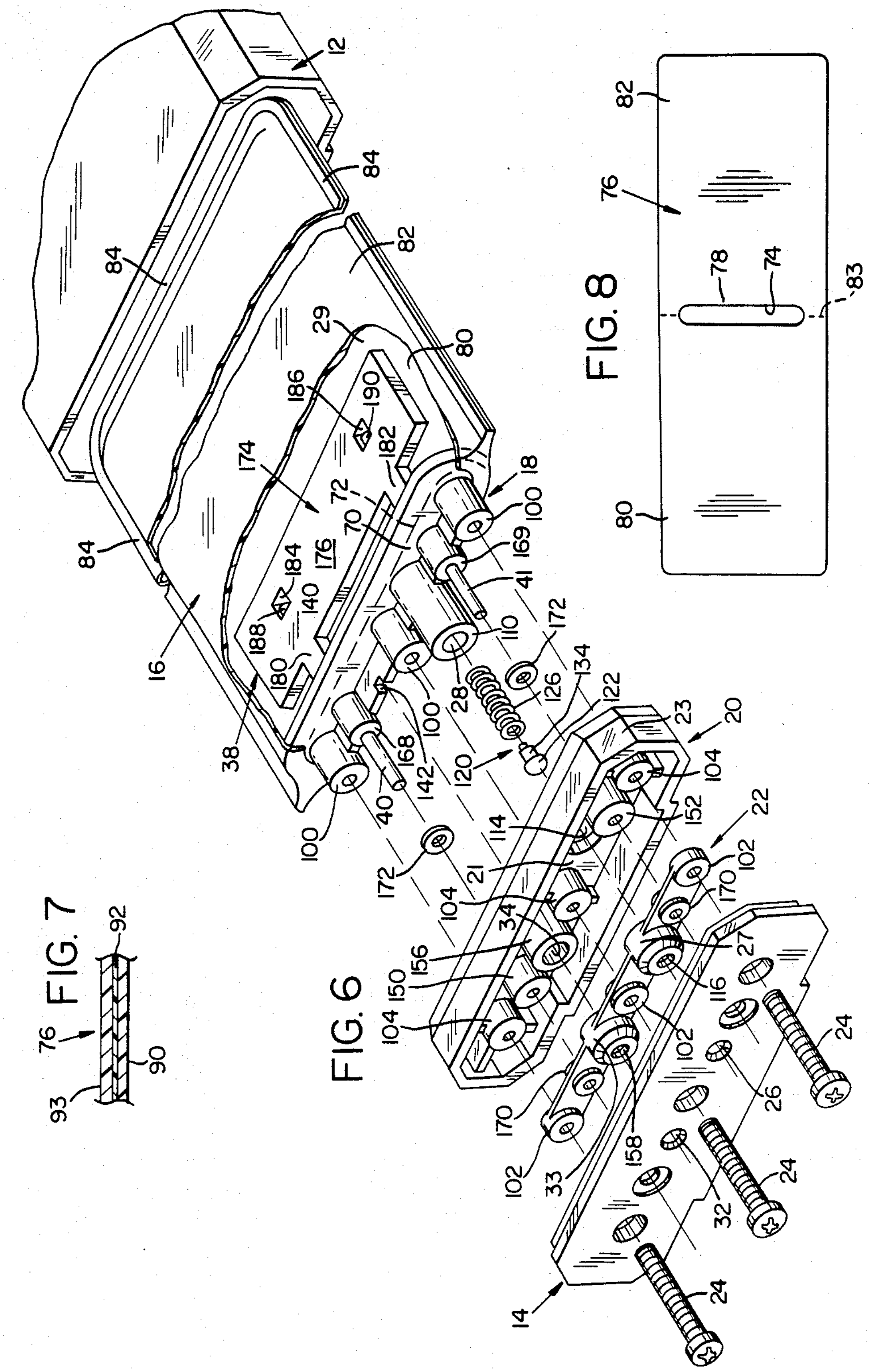
FIG. 6 is a partially broken away exploded view of the ink cartridge of FIG. 1.
FIG. 7 is a sectional view of a portion of the ink container.
FIG. 8 is a plan view of a sheet of ink container forming material during an intermediate ink cartridge manufacturing step.

With reference to FIGS. 1, 2 and 6, an ink cartridge 10 in accordance with the invention, comprises an elongated hermetically sealed housing including a rectangular body 12 closed at one end by a cap 14. Housed within the body is an ink container assembly comprised of an ink container 16 of a flexible, collapsible material which is mounted to an ink container support 18. The construction also includes a gasket support or retainer 20 between the ink container support 18 and cap 14. Also, a cap sealing gasket 22 is provided between the cap 14 and gasket support 20 for purposes explained below. Fasteners 24 secure the ink container support 18 to the cap, with the gasket retainer 20 and the gasket 22 in place. The gasket retainer 20 has a base 21 and a peripheral wall 23 which projects from the base 21 and into engagement with the underside of the cap 14 when this assembly is fastened together. This fastened assembly is positioned within the housing body 12 and the cap 14 is secured, as by adhesive, to the body 12 to seal the cartridge.

A path is provided for ink to flow from the interior of the ink container 16 to the exterior of the cartridge, from which the ink is delivered to an ink jet head of an ink jet printer. The cap 14 is provided with an ink flow port 26 which communicates through an O-ring portion 27 of gasket 22, when O-ring 27 is punctured, and through an ink flow passageway 28, described below, with the interior 29 of the ink container 16. In addition, a path is provided for delivering air from the ink jet printer to the cartridge. The air applies pressure to the exterior of the ink container 16 so as to enhance the flow of ink from the cartridge. More specifically, the cap 14 includes an air flow port 32 which communicates through an O-ring portion 33 of gasket 22, when O-ring 33 is punctured, and through a pressurized air flow passageway 34, described below, with a portion 35 of the housing body 12 which is within the housing body and outside of the ink container 16. Typical operating pressures are approximately one pound per square inch. Because the housing is hermetically sealed, pressurized air is not lost from the housing. Also, ink does not leak from the housing in the unlikely event that the ink container 16 ruptures.

The cartridge also includes an ink level sensor, designated generally at 38, for determining the level of ink within the cartridge. Although described in detail below, the ink level sensor includes a pair of electrical probes 40, 41 extending from the interior of the ink container 16 to the exterior of the cartridge housing. These probes are of an electrically conductive material which resists corrosion by the ink, such as stainless steel. The ink jet printer applies an alternating current voltage across the probes at a location outside of the housing. In addition, the resistance in a conducting path through the ink between the probes is monitored. This resistance varies as ink is used from the ink container and the ink container collapses. The magnitude of the resistance provides an indication of the amount of ink within the ink cartridge. In particular, from this resistance, a determination is made of when the ink cartridge is low of ink and should be changed.

The housing body 12 is formed of a lightweight, durable, rigid, impact-resistant material such as a polycarbonate material designated Lexan 141R-5107 and produced by General Electric Company. Because the cap 14 is exposed to ink passing through the ink flow port 27, it is desirable that this cap be formed of a material which resists corrosion when exposed to the ink. Polysulfone is one such suitable material.

Referring to FIGS. 1 and 2, the body 12 is preferably molded and comprised of top and bottom plates 40, 44, first and second side plates 46, 48 and an end plate 50. A handle 52 is formed by portions of the top plate 44 and side plates 46, 48 which extend beyond the end plate 50. Thus, handle 52 extends transversely between the two side plates and provides a convenient grip for use when removing and replacing the cartridge. The plate 44 includes a raised central portion 54, while keys 56 project upwardly from the plate 40. These keys and raised portion fit within a corresponding cartridge receiving socket of the ink jet printer and prevent inadvertant reversed installation of the cartridge. Guides 58 project from the sides 46, 48 of the housing 12 and fit within slots in the cartridge socket to support and properly align the ink cartridge when installed.

Figure 3:
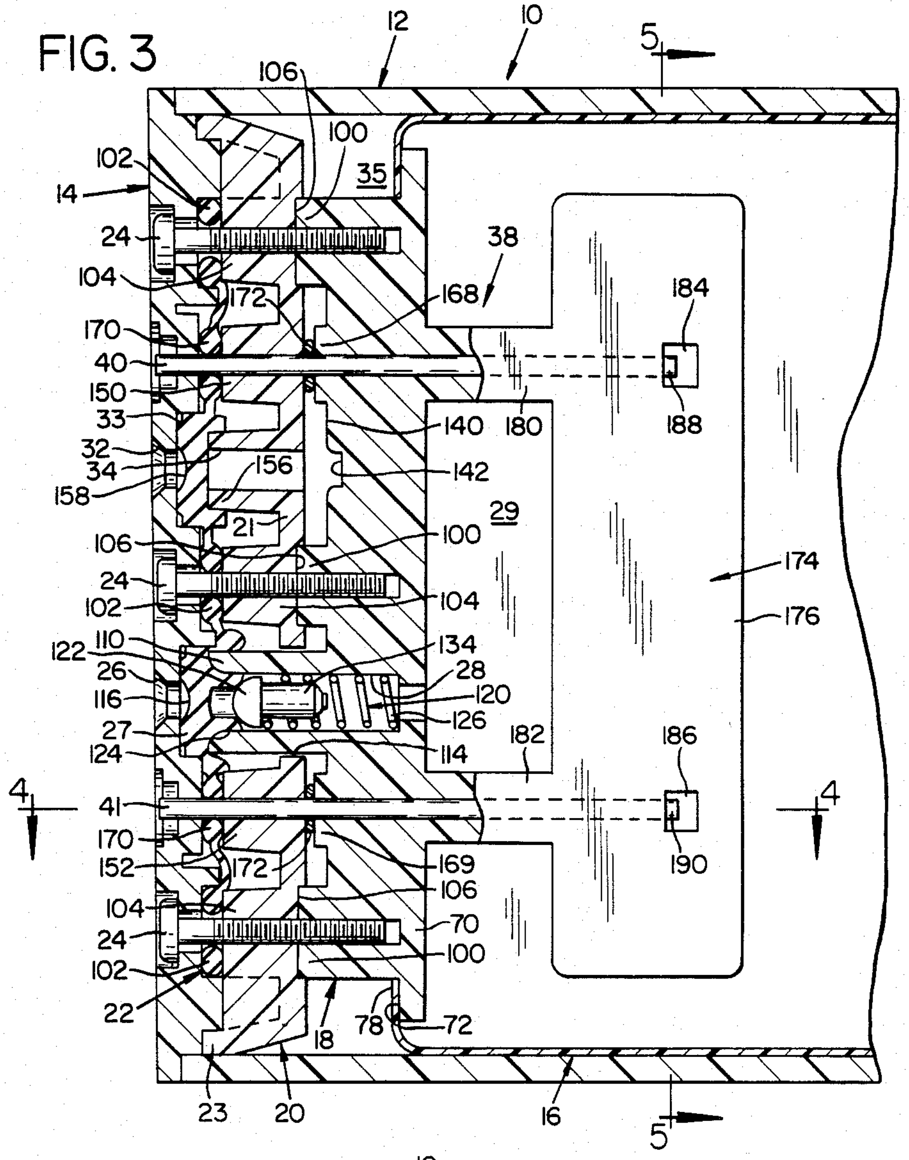
FIG. 3 is a sectional view of the ink cartridge of FIG. 1, taken along lines 3—3 of FIG. 1.
Figure 4:
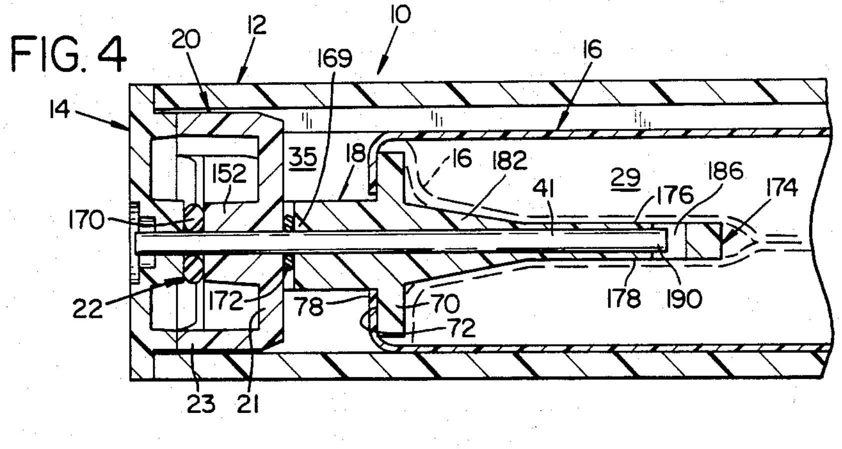
FIG. 4 is a sectional view of the ink cartridge of FIG. 1, taken along lines 4—4 of FIG. 3.

The ink container assembly is best understood with reference to FIGS. 3, 4 and 6. The ink container support 18 includes a support plate 70 with a flat planar ink container mounting surface 72 to which the ink container 16 is directly mounted and sealed. Although adhesive seals are suitable, in the preferred embodiment, this sealing is accomplished by thermally fusing the ink container to the mounting surface.

More specifically, in accordance with a preferred method of manufacturing the ink container assembly, a central opening 74 (FIG. 8) is provided in a rectangular sheet 76 of ink container forming material. The ink container support 18 is inserted upwardly through this opening 74 to position the marginal edge portions 78 of the sheet which bound the opening 74 against the mounting surface 72, as shown in FIG. 6. These edge portions are then thermally fused to the mounting surface. Thereafter, the ink container side forming portions 80, 82 of the sheet 76 are folded about the longitudinal axis of the ink container support plate 70, that is, along fold line 83 in FIG. 8, until positioned as shown in FIG. 6. The sides 80, 82 are then sealed together along edges 84, as by heat sealing, to complete the ink container assembly.

In the preferred embodiment, the ink container support 18 is formed of a material which resists corrosion by the ink, with polyethylene being one suitable material. Furthermore, the ink container 16, see FIG. 7, is formed of a sheet 76 of multi-layered construction. The inner most layer 90 is comprised of a material which is compatible with the ink. That is, it resists corrosion by the ink. Also, this material is suitable for heat sealing. This first layer may comprise a low density polyethylene. The central layer 92 of sheet 76 provides a vapor barrier which minimizes the passage of gas into the ink container 16. Gas in the ink may form minute bubbles which clog the ink jet head of the printer. One suitable vapor barrier is a sandwich of a layer of polyvinylacetate between two layers of polyvinylidene chloride. This latter material is commonly designated by the trademark SARAN. Finally, the outer layer 93 is an ink container reinforcing material, which adds strength and some stiffness to the ink container. One suitable example is sixty guage biaxial nylon. A multi-layered material which fits this description is presently being sold by Champion International Corporation of San Leandro, Calif. for applications such as containing wine within cardboard cartons.

The stiffness of the outer layer facilitates the collapsing of the bag in a predictable manner. This factor improves the performance of the ink level sensor 38, as explained below. Moreover, with this construction, and due to the relatively greater stiffness of this container when compared to the known prior art, it is easy to remove all gas from the ink container prior to filling the container with ink. This is accomplished by applying a vacuum to the ink flow port 26, which fully collapses the ink container and removes gas from the container.

With reference again to FIGS. 2, 4 and 6, plural fastener receiving bosses 100 project in a first direction toward cap 14 from the surface of the ink container support plate 70. Each of the fasteners 24 pass through an opening in the cap, an O-ring portion 102 of the gasket 22, a projection or boss 104 extending in the first direction from the base 21 of the gasket retainer 20, and is threaded into the fastener receiving bosses 100. As shown in FIG. 3, the ink container support 18 interfits the gasket retainer 20 so as to strengthen the construction. More specifically, the bosses 100 mate within corresponding recesses 106 which are provided in the gasket retainer base 21. Thus, when the cartridge is assembled, the ink container support is held securely in place.

An annular ink flow passageway defining projection 110 also extends in the first direction toward cap 14 from the plate 70. The ink flow passageway 28 extends through projection 110. When the cartridge is assembled, ink flow projection 110 passes through an opening 114 through the base 21 of the gasket retainer 20. This projection 110 abuts the interior surface of the gasket O-ring portion 27. The opposite surface of the O-ring portion 27 surrounds and seals the ink flow port 26. The center 116 of the O-ring portion 27 is initially sealed as indicated in FIG. 3. When this seal is punctured, ink is permitted to flow from the ink container 16, through the ink flow passageway 28, through the gasket portion 27 and out of the ink flow port 26. A check valve assembly 120 is provided within the passageway 28. The assembly 120 includes a valve having a hemispherical head 122. The head 122 is urged against a valve seat 124 of the O-ring portion 27 by a coil spring 126 positioned within the ink flow passageway. The valve has a stem 134 which extends loosely within the center of the coil spring so that the valve is retained in place without the need for adhesive. The valve and spring are preferably of an ink corrosion resistant material, such as respectively of polyethylene and stainless steel.

A reinforcing rib 140 extends between the various projections of the ink container support. This rib has a notch 142 which is positioned in alignment with the pressure fluid port 32 when the cartridge is assembled. The notch 42 provides an enlarged unobstructed opening and clearance for insertion of an air supply needle into the interior 35 of the housing 12.

Various gasket retaining projections extend in the first direction toward the cap 14 from the base 21 of the gasket retainer 20. As previously mentioned, these gasket retaining projections include the bosses 104. In addition, these projections include annular projections 150, 152 through which the respective probes 40, 41 are inserted when the cartridge is assembled. In addition, an annular pressure air flow projection 156 extends in this first direction from the base 21 of the gasket retainer 20. The air flow passageway 34 passes through the projection 156. The air flow projection extends into engagement with the interior surface of the O-ring portion 33 of the gasket 22. The other surface of O-ring portion 33 is positioned against the cap 14 and surrounds and seals the air flow port 32. The center 158 of O-ring portion 33 is initially sealed to block the flow of air through port 32 until the gasket is punctured. As can be seen from FIG. 3, upon puncturing the O-ring portion 33 at 158, pressurized air may be delivered through the flow port 32, through the gasket O-ring portion 33, through the passageway 34, and past the notch 142 and into the interior 35 of the housing 12. Reinforcing ribs provide added support to the various projections from the gasket retainer. Thus, when assembled, the gasket 22 is held by the projections of the gasket retainer 20 against the cap 14. Appropriate recesses, unnumbered, are provided in the interior surface of the cap 14 for receiving the gasket 22.

The probes 40, 41 are preferably molded into the ink container support 18 during the manufacture of this support. Projections 168, 169 extend toward the cap 14 from the ink container plate 70 and surround and reinforce the respective probes 40, 41 at the location where the probes emerge from the plate 70. Probe 40 extends from the projection 168, through projection 150 of the gasket retainer 20, through an O-ring portion 170 of the gasket 22 and through an opening in cap 14 to the exterior of the cartridge. Similarly, probe 41 extends from projection 169, through projection 152 of the gasket retainer 20, through a corresponding O-ring portion 170 of the gasket 22 and through another opening in cap 14 to the exterior of the cartridge. Also, O-rings 172 surround and seal the probes 40, 41 at a location between projections 168, 169 and the base 21 of the gasket retainer 20. Thus, the probes 40, 41 are supported securely and are easily accessible for application of a voltage across the ends of the probes which are exposed to the exterior of the cartridge.

The gaskets 22 and 172 are typically of an ink corrosion resistant material of suitable resiliency, such as rubber. Ethylenepropylene of 50 durometer on the Shore A scale is one suitable gasket material. Also, the gasket support 20 may be of the same material as housing 12.

With this construction, the ink cartridge 10 is extremely resistant to ink leakage arising from impact to the cartridge, environmental temperature fluctuations, above normal pressure within the ink cartridge, and exposure of internal and external portions of the cartridge housing to ink. Moreover, the ink cartridge is easy to manufacture, install and use.

The ink level sensor 38 and its operation will be described with reference to FIGS. 3, 4 and 5. The ink level sensor 38 includes a probe supporting structure 174 projecting from the ink container support plate 70 into the interior of the ink container 16. A portion of the probes, in this case the probe tips 188, 190 are exposed by the supporting structure to ink within the interior of the ink container 16. The ink being conductive, upon application of a voltage across the probes, the resistance of the conductive path through the ink and between the two probes may be monitored by the ink jet printer. As ink is used, the ink container 16 collapses as shown in dashed lines in FIGS. 4 and 5. Eventually, the path between the two probes through the ink is completely blocked by the collapsed ink container 16. When this occurs, the monitored resistance jumps to a high level. This change in resistance provides an indication that the ink cartridge 16 is low of ink and should be replaced.

More specifically, the probe supporting structure 174 may comprise a platform supported by necks 180, 182 which project from the ink container support plate 70. The probes 40, 41 extend through the respective necks and into the interior of the platform 174. As can be seen in FIG. 4, these necks are tapered moving away from the ink container support plate 70. This tapering guides the container 16 as it collapses to facilitate such collapse in a controlled uniform manner.

Apertures 184, 186 are provided through the platform 174 with the tips 188, 190 of the probes extending into these apertures. Thus, the exposed portions of the probes are completely surrounded by the platform 174. As the ink is used, the ink container 16 collapses against upper and lower flat planar ink container closure surfaces 176, 178 of platform 174. This closes off the conductive path between the two probes. Furthermore, this ink container collapses against surfaces 176, 178 when consistently the same amount of ink remains in the ink cartridge.

Figure 5:
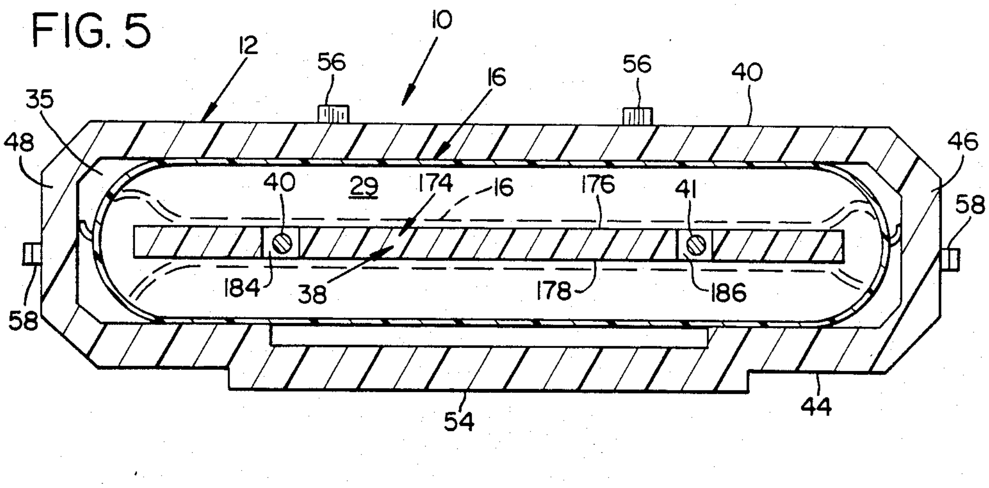
FIG. 5 is a cross sectional view of a portion of the ink cartridge of FIG. 1, taken along lines 5—5 of FIG. 3.

Moreover, as can be seen in FIG. 5, the probes are sized so as not to project into the planes of the upper and lower surfaces 176, 178 of the platform. Therefore, the probes themselves do not interfere with the closing of the ink container against the closure surfaces. Thus, a flat closure surface is provided between the exposed regions of the probe. Only one such flat surface would be provided in the event the probes are only exposed to ink through one surface of the probe supporting structure.

Therefore, by monitoring the resistance, a precise determination can be made of the amount of ink in the cartridge. Furthermore, the cartridges may be changed before they run dry of ink, which could cause a bubble to form in the ink jet head and clog the head. For example, for a 200 milliliter volume cartridge, it is desirable to change the cartridge when no less than 20 milliliters of ink remain. Also, changing of the cartridges is not performed too soon, which would waste significant amounts of ink in the cartridge. The ink jet printer is provided with a shut off circuit which automatically stops the printer when a cartridge is low of ink, as indicated by the resistance measured across the probes. After the cartridge is replaced, the printer is then restarted.

Having illustrated and described the principles of my invention with respect to one preferred embodiment, it should be apparent to those persons skilled in the art that such invention may be modified in arrangement and detail without departing from such principles.

I claim as my invention all such modifications as come within the true spirit and scope of the following claims:

1. An ink cartridge for an ink jet printing apparatus of the type which supplies pressurized fluid to the cartridge for pressurizing ink within the cartridge to enhance the flow of ink from the cartridge to an ink jet printing head of the ink jet printing apparatus, the ink cartridge comprising:

an ink container assembly including a collapsible ink container with an ink container support receiving opening, and an ink container support means connected to the portion of the ink container which defines the support receiving opening so as to seal the ink container support means to the ink container, the ink container being formed from a sheet of flexible material having the support receiving opening in the middle by folding the sheet over the ink support means and sealing the edges, the ink container support means having an ink flow opening therethrough which communicates with the interior of the ink container; and a hollow housing which receives the ink container assembly, the housing including an ink flow port through which ink passing from the ink container and through the ink flow opening is delivered to the exterior of the housing, the housing also including a fluid flow port communicating with the interior of the housing and exteriorly of the ink container, whereby upon supplying pressurized fluid through the fluid flow port to the interior of the housing, pressure is applied to the exterior of the ink container to enhance the flow of ink through the ink flow opening and ink flow port.

2. An ink cartridge according to claim 1 in which the portion of the ink container which defines the support receiving opening is thermally fused to the ink container support means to seal the ink container support means to the ink container.

3. An ink cartridge according to claim 2 in which the ink container support means comprises a support plate with an ink container mounting surface along the perimeter of the support plate, the portion of the ink container which defines the support receiving opening abutting the ink container mounting surface and being thermally fused to the ink container mounting surface so as to seal the ink container support means to the ink container.

4. An ink cartridge according to claim 3 in which the ink container mounting surface is planar.

5. An ink cartridge according to claim 1 in which the ink container is comprised of a first interior layer of a material which resists corrosion by ink in contact with the first interior layer, a second layer of a vapor barrier material, and a third layer of a container reinforcing material.

6. An ink cartridge according to claim 5 in which the second layer is intermediate the first interior and third layers, the first interior layer comprising polyethylene, the second layer comprising a film of polyvinylacetate sandwiched between first and second films of polyvinylidene chloride, and the third layer comprising a biaxial nylon layer.

7. An ink cartridge according to claim 1 in which the housing comprises an elongated body having an ink container assembly receiving opening through which the ink container assembly is inserted into the body, the housing also including cap means mounted to the body for closing and sealing the ink container assembly receiving opening, the ink flow and fluid flow ports being provided through the cap means;

gasket support means positioned intermediate the cap means and the ink container support means, the gasket support means including a base with first and second side surfaces, the second side surface being positioned adjacent to the ink container support means, the gasket support means having a wall projecting from the perimeter of the first surface of the base in a first direction and into engagement with the interior surface of the cap means, the gasket support means also having plural gasket retaining projections extending in the first direction from the base;

fluid flow passageway means for providing a fluid flow passageway from the fluid flow port to the interior portion of the housing which is outside the ink container;

ink flow passageway means for providing an ink flow passageway from the ink flow port to the ink flow opening;

gasket means positioned intermediate the cap means and the gasket support means, said gasket means abutting and being supported in position by the gasket retaining projections, the gasket means comprising means for sealing the fluid flow and ink flow passageways, said gasket means also including puncturable seal means for selectively blocking the ink flow and fluid flow passageways until such puncturable seal means is punctured; and fastener means for mounting the ink container support means to the cap means with the gasket means and gasket support means positioned between the cap means and the ink container support means.

8. An ink cartridge according to claim 7 in which a first of said gasket retaining projectings comprises the fluid flow passageway means, the fluid flow passageway being provided through the first projection.

9. An ink cartridge according to claim 8 in which said base includes an aperture therethrough in alignment with the ink flow port, the ink flow passageway means comprising an ink flow projection extending in the first direction from the ink container support means and passing through the aperture, the ink flow passageway being provided through the ink flow projection.

10. An ink cartridge for an ink jet printing apparatus of the type which supplies pressurized fluid to the cartridge for pressurizing ink within the cartridge to enhance the flow of ink from the cartridge to an ink jet printing head of the ink jet printing apparatus, the ink cartridge comprising:

an ink container assembly including a flexible ink container with an ink container support receiving opening, and an ink container support means connected to the portion of the ink container which defines the support receiving opening so as to seal the ink container support means to the ink container, the ink container being formed from a sheet of flexible material having the support receiving opening in the middle by folding the sheet over the ink container support means and sealing the edges, the ink container support means having an ink flow opening therethrough which communicates with the interior of the ink container, the ink container support means comprising a support plate with a planar ink container mounting surface along the perimeter of the support plate, the portion of the ink container which defines the support receiving opening abutting the ink container mounting surface and being thermally fused to the ink container mounting surface so as to seal the ink container to the ink container support means;

a hollow housing which receives the ink container assembly, the housing including an ink flow port through which ink passing from the ink container and through the ink flow opening is delivered to the fluid flow port communicating with the portion of the interior of the housing which is outside of the ink container, whereby upon supplying pressurized fluid through the fluid flow port to the interior of the housing, pressure is applied to the exterior of the ink container to enhance the flow of ink through the ink flow opening and ink flow port, the housing comprising an elongated body having an ink container assembly receiving opening through which the ink container assembly is inserted into the body, the housing also including cap means mounted to the body for closing and sealing the ink container assembly receiving opening, the ink flow and fluid flow ports being provided through the cap means;

gasket support means positioned intermediate the cap means and the ink container support means, the gasket support means including a base with first and second side surfaces, the second side surface being positioned adjacent to the ink container support means, the gasket support means having a wall projecting from the perimeter of the first surface of the base in a first direction and into engagement with the interior surface of the cap means, the gasket support means also having plural gasket retaining projections extending in the first direction from the base, a first of said gasket retaining projections defining a fluid flow passageway therethrough which communicates from the fluid flow port through the base of the gasket support means to the region between the ink container and body of the housing;

the base of the gasket support means also including an aperture therethrough in alignment with the ink flow port, the support plate including an ink flow projection extending in the first direction from the support plate and passing through the aperture, the ink flow projection defining an ink flow passageway for the passage of ink therethrough from the ink flow port to the ink flow opening;

valve means in the ink flow passageway for selectively blocking the flow of ink from the ink container and ink flow opening through the ink flowport;

gasket means positioned intermediate the cap means and the gasket support means, said gasket means abutting and being supported in position by the gasket retaining projections and by the ink flow projection, the gasket means comprising means for sealing the fluid flow and ink flow passageways, said gasket means also including puncturable seal means for selectively blocking the ink flow and ink flow passageways until such puncturable seal means is punctured; and fastener means for mounting the ink container support means to the cap means with the gasket means and gasket support means positioned between the cap means and the ink container support means.

11. An ink cartridge according to claim 10 including means for cooperatively interfitting the ink container support means to the second surface of the base of the gasket support means.

12. An ink cartridge according to claim 11 in which said means for cooperatively interfitting comprise recesses defined by the second surface of the base, the ink container support means including projections extending in the first direction from the plate which are sized for insertion into the recesses to thereby cooperatively interfit the ink container support means and gasket support means.

13. A method of manufacturing an ink cartridge for an ink jet printing apparatus of the type which supplies pressurized fluid to the cartridge for pressurizing ink within the cartridge to enhance the flow of ink from the cartridge to an ink jet printing head of the ink jet printing apparatus, the method comprising:

providing a central ink container support receiving opening in a sheet of flexible ink container forming material;

positioning an ink container support within the ink container support receiving opening, the support having an ink flow opening therethrough, connecting and the portions of the sheet which bound the ink container support receiving opening to the ink container support so as to seal such portions to the ink container support;

folding the sheet of ink container forming material about the ink container support to form first and second sides of an ink container; and fastening the edges of the first and second sides together to form an ink container, the interior of the ink container communicating with the exterior thereof through the ink flow opening;

enclosing the assembled ink container and ink container support in a housing which has an ink flow port in communication with the ink flow opening, the housing also having a fluid flow port in communication with the interior of the housing and exteriorly of the ink container, whereby pressurized fluid entering the fluid flow port applies pressure to the ink container and enhances the flow of ink from the ink container and ink flow opening to the ink flow port.

14. A method of manufacturing an ink cartridge according to claim 13 in which the step of connecting the portions of the sheet to the ink container support comprises the step of thermally fusing the portions of the sheet which bound the ink container support receiving opening to the ink container support, and in which the step of fastening the side edges of the first and second sides together comprises thermally fusing the first and second sides together along their edges to form the ink container.

15. A method of manufacturing an ink cartridge according to claim 14 including the step of applying a vacuum to the ink flow port to withdraw gases from the ink container and, following the removal of such gases, filling the ink container with ink.

* * * * *